Patented Mar. 1, 1932

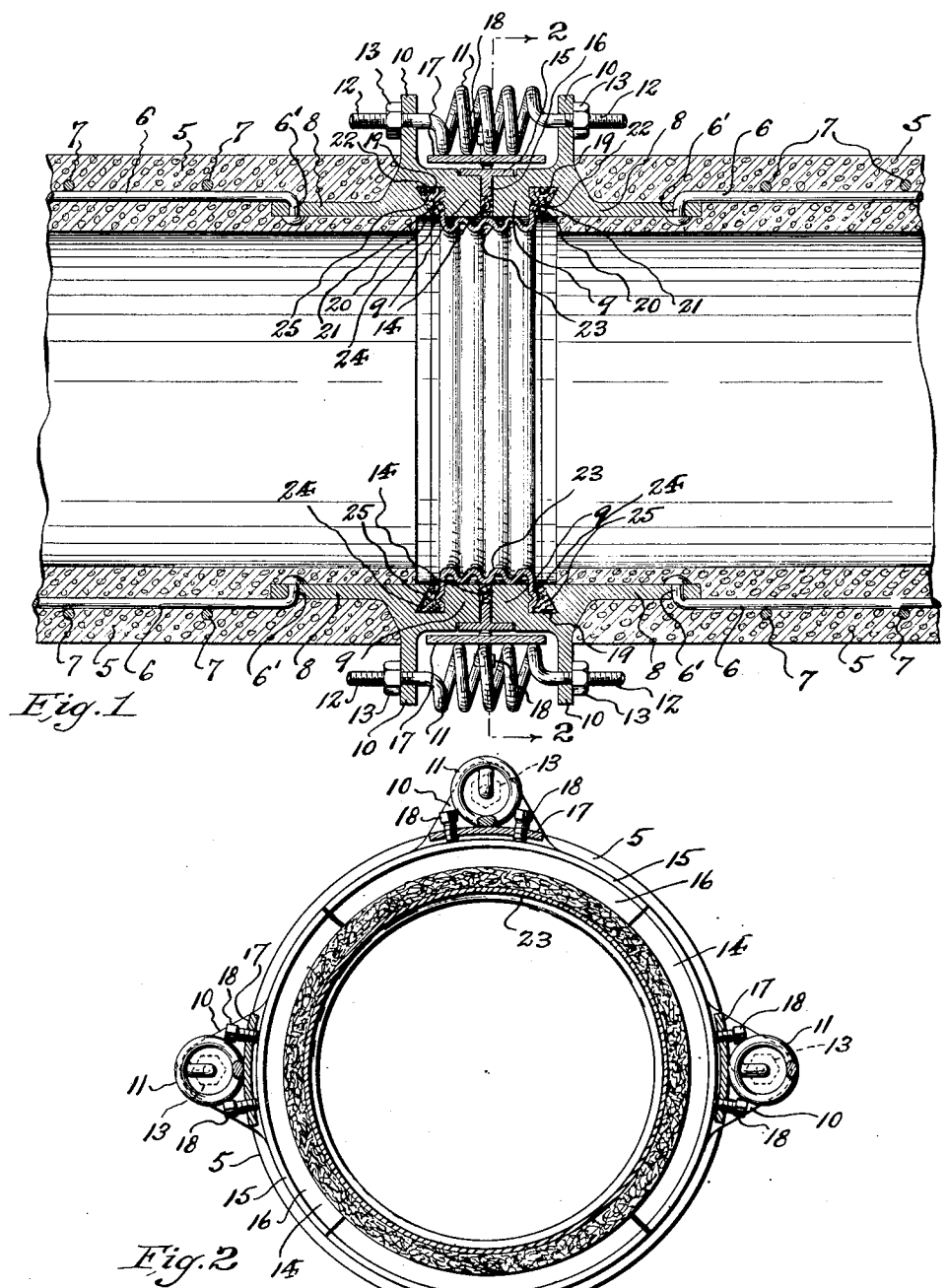

1,847,676

UNITED STATES PATENT OFFICE

FRANCIS H. SHERRERD, OF EAST ORANGE, NEW JERSEY, AND ALBERT M. BROSIUS, OF WHITE PLAINS, NEW YORK

JOINT FOR PRESSURE PIPES

Application filed January 15, 1930. Serial No. 420,831.

This invention relates, generally, to improvements in concrete pipes and conduits; and the invention has reference, more particularly, to a novel leak-proof joint for concrete pressure pipes.

This invention has for its principal object to provide in combination with reenforced concrete pipe or conduit sections, means whereby adjoining sections may be coupled together in such manner that a strong pressure resisting leak-proof joint is established therebetween; said joint being so constructed that the same will readily yield to pipe or conduit movements due to expansion or contraction without risk of weakening the joint or opening the same at any point to the impairment of its pressure resisting efficiency.

An illustrative embodiment of this invention is shown in the accompanying drawings, in which:—

Fig. 1 is a longitudinal sectional view of adjoining pipe or conduit sections equipped with the novel leak-proof joint made according to and embodying the principles of this invention; and Fig. 2 is a transverse section of the same, taken on line 2—2 in said Fig. 1.

Similar characters of reference are employed in all of the hereinabove described views to indicate corresponding parts.

Referring to the drawings, the reference character 5 indicates adjacent pipe or conduit sections made of concrete, the same being suitably reenforced by longitudinal reenforcing rods 6 and annular transverse reenforcing members 7.

Imbedded in the ends of said pipe or conduit sections 5 are annular cast-iron or steel collars or shells 8, having external end portions 9 of increased wall thickness. Radially projecting, in circumferentially equi-spaced relation from and about the shells 8, and rearwardly spaced relative to the outer extremities of the external end portions 9 thereof, are a plurality of perforate lugs or ears 10. Preferably the reenforcing rods 6 are connected with the collars or shells 8, as by riveted end portions 6', or in any other convenient and suitable manner.

When two pipe or conduit sections are aligned in end to end relation, the external end portions 9 of collars or shells 8 at the adjoining or abutting ends thereof will be aligned together and opposed one to the other; the same being relatively positioned so that perforate lugs or ears 10 of one pipe or conduit end will be aligned opposite corresponding perforate lugs or ears 10 of the other pipe or conduit end.

Arranged between each pair of opposed lugs or ears 10 are resilient coupling members, the same preferably comprising stiff spring elements 11, terminating at each end in axial threaded end shanks 12, which extend respectively through the respective perforate lugs or ears 10. Engaged on said threaded end shanks 12 are fastening nuts 13.

The space between the abutting end faces of said external end portions 9 of the shells or collars 8 is preferably filled with a suitable calking material 14. Said calking material 14, being more or less elastic, will permit sufficient play or movement between adjoining pipe or conduit section ends under forces of expansion and contraction. Preferably a keeper ring structure is externally applied around the adjoining pipe or conduit section ends for cooperation with said calking material 14, so as to prevent outward displacement thereof. This keeper ring structure comprises an annular band 15 having an annular rib 16 extending from the inner side thereof and at right angles thereto. This keeper ring may be made in sections, as shown in Fig. 2, if desired. In assembling the keeper ring in operative relation to the adjoining pipe or conduit section ends, the same is externally overlaid upon and around the adjacent external faces of the end portions 9 of the shells or collars 8, with the rib 16 extending between said end portions 9 to abut the calking material 14. In order to retain the keeper ring in the described assembled relation, retaining plates 17 are engaged beneath the spring coupling elements 11, so as to project beyond opposite sides of the latter, and carried by the retaining plates 17 are adjustable set-screws 18, which when screwed home are adapted to bear upon the outer face of the keeper ring structure, while at the same time causing the retaining plates 17 to be purchased against the underside of said spring coupling elements.

The external end portions 9 of the shells or collars 8 are each provided, at their internal sides, and spaced back from the free extremities thereof, with annular channels or grooves 19. Said channels or grooves 19 are bounded on their forward or outer sides with straight or right-angled wall-faces 20, having projecting therefrom an annular sharp edged anchor rib 21; the rearward or inner sides of said channels or grooves are oblique or inwardly undercut as at 22.

The reference character 23 indicates an annularly corrugate sealing sleeve preferably made of sheet metal, such e. g. as lead which is non-corrosive. At each end, said sealing sleeve 23 is provided with outwardly extending annular anchor flanges 24. After the adjacent pipe sections are engaged together, by joining the external end portions 9 of the shells or collars 8 by means of spring coupling elements 11, said sealing sleeve 23 is mounted within and between the adjoining end portions 9 of the shells or collars 8 so as to bridge the calked joint therebetween, and the respective anchor flanges 24 are turned into corresponding channels or grooves 19, so as to lie adjacent to and along the wall faces 20 of the latter. When the sealing sleeve is thus assembled, a binding packing material 25 is introduced and tamped or pounded home within the channels or grooves 19, thus providing locking keys for retaining said anchor flanges bedded in said channels or grooves. In tamping home the packing material 25, the same will be caused to fill the interior of the channels or grooves 19, and will press the anchor flanges 24 against the straight wall faces 20 thereof, while at the same time causing the anchor-ribs 21 to imbed themselves in the anchor flanges 24 with strong holding and sealing effect, as shown in Fig. 1. The oblique or undercut sides 22 of the channels or grooves act to interlock the tamped packing material with the end portions 9 of the shells or collars 8. In this manner a tightly sealed joint between adjoining pipe or conduit sections is produced, which is exceedingly efficient and highly resistant to fluids under pressure flowing through the pipe or conduit. Not only is the resultant joint possessed of leak-proof characteristics desired in pressure pipe or conduit, but the joint structure is readily capable of automatically adjusting itself to movement of the pipe or conduit sections induced by the forces of expansion and contraction, without any attendant risk of opening up the joint to the escape of fluid. The elastic coupling elements 11 will yield to forces tending to separate the pipe or conduit sections, and will also draw the pipe or conduit sections together when separating forces are relieved. The tension of the spring coupling elements 11 may be adjusted to desired degree by screwing up the fastener nuts 13.

We are aware that many changes could be made in the above described joint structure, as well as in the details thereof, without departing from the scope of this invention, and therefore it is intended that all matter contained in the above description or shown in the accompanying drawings shall be interpreted as illustrative and not in a limiting sense.

We claim:—

1. A joint structure for concrete pressure pipes, comprising metallic collars imbedded respectively in opposed ends of adjoining pipe sections, said collars having exposed external end portions, lugs radially projecting from said external end portions, resilient coupling elements connected between opposed lugs, each collar having an annular groove in its inner side, the outer face of said groove having an annular anchor rib projecting therefrom and the inner face of said groove being inwardly undercut, a sealing sleeve to bridge the joint between the abutting ends of said collars, said sealing sleeve having anchor flanges at its ends respectively disposed within said grooves to overlie the outer faces thereof, and packing material tamped into said grooves to force said anchor flanges of said sealing sleeve into interlocking engagement with said anchor ribs.

2. A joint structure for concrete pressure pipes, comprising metallic collars imbedded respectively in opposed ends of adjoining pipe sections, said collars having exposed external end portions, perforate lugs radially projecting from said external end portions, coupling spring elements having threaded axial shanks at their ends for engagement through opposed perforate lugs, fastener nut to secure said coupling spring elements in tensional extension between opposed perforate lugs, each collar having an annular groove in its inner side adjacent to its outer free end, the outer face of said groove having an annular anchor rib projecting therefrom and the inner face of said groove being inwardly undercut, an annularly corrugated metallic sealing sleeve to bridge the joint between the abutting ends of said collars, said sealing sleeve having anchor flanges at its ends respectively disposed within said grooves to overlie the outer faces thereof, and packing material tamped into said grooves to force said anchor flanges of said sealing sleeve into interlocking engagement with said anchor ribs.

3. A joint structure for concrete pipes as defined in claim 1, including a calking material disposed within the joint between the abutting ends of said collars, keeper ring means externally applied over said joint and having means to engage and retain said calking material against outward displacement, and means to secure said keeper ring means in operative assembled relation to said joint structure.

4. A joint structure for concrete pipes as defined in claim 2, including a calking material disposed within the joint between the abutting ends of said collars, keeper ring means externally applied over said joint and having means to engage and retain said calking material against outward displacement, and means to secure said keeper ring means in operative assembled relation to said joint structure.

In testimony, that we claim the invention set forth above we have hereunto set our hands this 7th day of January, 1930.

FRANCIS H. SHERRERD.
ALBERT M. BROSIUS.